(12) United States Patent
Simionescu et al.

(10) Patent No.: US 11,397,683 B2
(45) Date of Patent: Jul. 26, 2022

(54) LOW LATENCY CACHE FOR NON-VOLATILE MEMORY IN A HYBRID DIMM

(71) Applicant: Micron Technology, Inc., Boise, ID (US)

(72) Inventors: Horia C. Simionescu, Foster City, CA (US); Paul Stonelake, San Jose, CA (US); Chung Kuang Chin, Saratoga, CA (US); Narasimhulu Dharanikumar Kotte, Milpitas, CA (US); Robert M. Walker, Raleigh, NC (US); Cagdas Dirik, Indianola, WA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 17/003,331

(22) Filed: Aug. 26, 2020

(65) Prior Publication Data
US 2021/0089454 A1 Mar. 25, 2021

Related U.S. Application Data

(60) Provisional application No. 62/903,198, filed on Sep. 20, 2019.

(51) Int. Cl.
*G06F 12/0817* (2016.01)
*G06F 13/16* (2006.01)
(Continued)

(52) U.S. Cl.
CPC ...... *G06F 12/0824* (2013.01); *G06F 12/0891* (2013.01); *G06F 12/123* (2013.01); *G06F 13/161* (2013.01)

(58) Field of Classification Search
None
See application file for complete search history.

(56) References Cited

U.S. PATENT DOCUMENTS 8,140,764 B2 * 3/2012 Shen .................. G06F 12/0864
711/129
2004/0088479 A1 * 5/2004 Hall ..................... G06F 3/0659
711/112
(Continued)

FOREIGN PATENT DOCUMENTS

WO 2017052595 A1 3/2017

OTHER PUBLICATIONS

PCT Notification of Transmittal Of The International Search Report And The Written Opinion Of The International Searching Authority for PCT Application No. PCT/US2020/051299, dated Dec. 23, 2020, 9 pages.

*Primary Examiner* — Yaima Rigol
(74) *Attorney, Agent, or Firm* — Lowenstein Sandler LLP

(57) ABSTRACT

Systems and methods are disclosed including a first memory device, a second memory device coupled to the first memory device, where the second memory device has a lower access latency than the first memory device and acts as a cache for the first memory device. A processing device operatively coupled to the first and second memory devices can track access statistics of segments of data stored at the second memory device, the segments having a first granularity, and determine to update, based on the access statistics, a segment of data stored at the second memory device from the first granularity to a second granularity. The processing device can further retrieve additional data associated with the segment of data from the first memory device and store the additional data at the second memory device to form a new segment having the second granularity.

20 Claims, 6 Drawing Sheets

(51) Int. Cl.
*G06F 12/123* (2016.01)
*G06F 12/0891* (2016.01)

(56) References Cited

U.S. PATENT DOCUMENTS

| | | | |
|---|---|---|---|
| 2004/0205300 A1* | 10/2004 | Bearden | G06F 12/0862 |
| | | | 711/113 |
| 2006/0184740 A1* | 8/2006 | Ishikawa | G06F 12/0875 |
| | | | 711/129 |
| 2008/0189452 A1 | 8/2008 | Merry et al. | |
| 2009/0100224 A1 | 4/2009 | Wang | |
| 2014/0372668 A1* | 12/2014 | Yeh | G06F 12/0292 |
| | | | 711/103 |
| 2015/0081981 A1 | 3/2015 | Mckean et al. | |
| 2016/0092356 A1* | 3/2016 | Suman | G06F 3/067 |
| | | | 711/130 |
| 2016/0092359 A1* | 3/2016 | Busaba | G06F 12/0817 |
| | | | 711/141 |
| 2018/0113629 A1 | 4/2018 | Kim et al. | |
| 2019/0171575 A1* | 6/2019 | Chen | G06F 12/0246 |

\* cited by examiner

LOW LATENCY CACHE FOR NON-VOLATILE MEMORY IN A HYBRID DIMM

RELATED APPLICATION

This application claims the benefit of U.S. Provisional Application No. 62/903,198, filed Sep. 20, 2019, the entire content of which is hereby incorporated by reference.

TECHNICAL FIELD

Embodiments of the disclosure relate generally to memory sub-systems, and more specifically, relate to a low latency cache for non-volatile memory in a hybrid dual in-line memory module (DIMM).

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
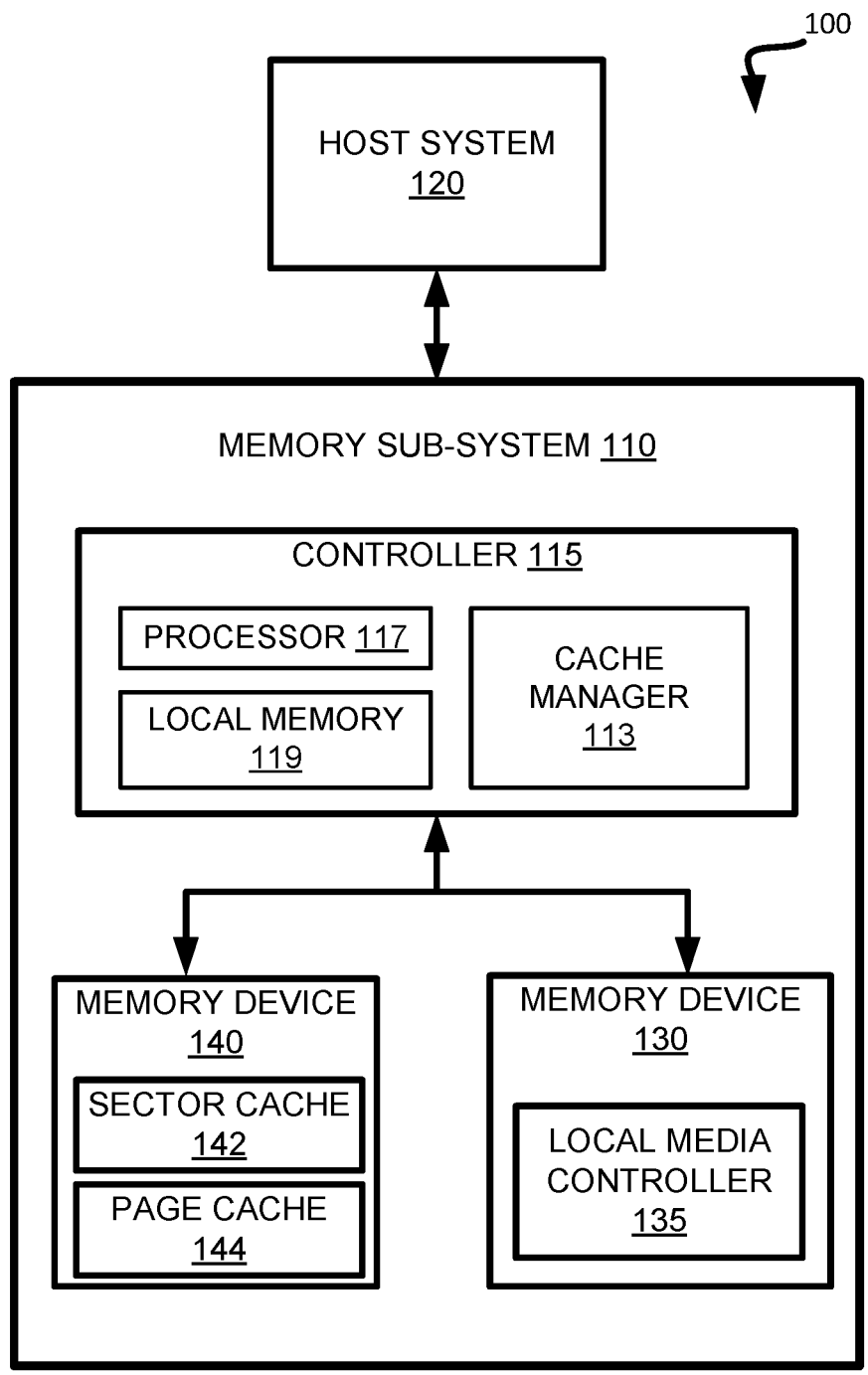
FIG. 1 illustrates an example computing system that includes a memory sub-system in accordance with some embodiments of the present disclosure.

Aspects of the present disclosure are directed a low-latency cache for non-volatile memory in a hybrid dual in-line memory module. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include both non-volatile and volatile memory devices. One example of non-volatile memory devices is a negative-and (NAND) memory device. Another example is a three-dimensional cross-point ("3D cross-point") memory device, which is a cross-point array of non-volatile memory cells. Other examples of non-volatile memory devices are described below in conjunction with FIG. 1. A non-volatile memory device is a package of one or more dice. The dice in the packages can be assigned to one or more channels for communicating with a memory sub-system controller. Each die can include a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

The non-volatile memory devices can include three-dimensional cross-point ("3D cross-point") memory devices that are a cross-point array of non-volatile memory cells and can perform bit storage based on a change of bulk resistance, in conjunction with a stackable cross-gridded data access array. Additionally, in contrast to many flash-based memories, 3D cross-point memory devices can perform a write in-place operation, where a non-volatile memory cell can be programmed without the non-volatile memory cell being previously erased. Such non-volatile memory devices can group pages across dice and channels to form management units (MUs).

The memory sub-system can be a hybrid DIMM that includes a first type of a memory device (e.g., 3D cross-point media) and a second type of memory device (e.g., a dynamic random access memory (DRAM)) in a single DIMM package. The first type of memory device (i.e., a first memory type) can have a large storage capacity but a high access latency while the second type of memory device (i.e., a second memory type) has a smaller storage capacity but a lower access latency. A cache manager can manage retrieval, storage, and delivery of data to and from the first type of memory device and the second type of memory device. In conventional memory systems, the cache manager resides in the host system, and is operatively coupled to a first controller which communicates with the first type of memory device and a second controller which communicates with the second type of memory device. Implementing the cache manager in the host system can create inefficiencies, however. For example, data traffic between the first memory type and the second memory type can be limited by channel protocol, resulting in a decreased cache hit rate and poor performance.

Aspects of the present disclosure address the above and other deficiencies by implementing a hybrid DIMM that includes a cache manager on the DIMM package. The cache manager allows the second type of memory to act as a cache for the first memory type. Thus, the high latency of the first memory type can be masked by the low latency of the second memory type if the cache hit rate is high. For example, a DRAM memory device, or other volatile memory, can be used as a cache memory for a 3D cross-point memory device, or other non-volatile memory device, such as storage class memory (SCM). The host system can utilize the hybrid DIMM to retrieve and store data at the 3D cross-point memory. The hybrid DIMM can be coupled with the host system by a bus interface (e.g., the DIMM connector). The DIMM connector can be a synchronous or an asynchronous interface between the hybrid DIMM and the host system. When the host system provides a memory access operation, such as a read operation, the corresponding data can be returned to the host system from the 3D cross-point memory or from another memory device of the hybrid DIMM that is a cache memory for the 3D cross-point memory.

In an illustrative example, the DRAM can be structured as a cache that stores recently accessed, and/or highly accessed data so that such data can be accessed quickly by the host system. The DRAM data cache can be partitioned into two different caches that are managed at different data sizes. One of the partitions can include a page cache utilizing a larger granularity (i.e., a larger size) and the second partition can include a sector cache utilizing a smaller granularity (i.e., a smaller size). Because the page cache utilizes a larger data size, less metadata is used to manage the data (e.g., only a single valid bit for the entire page). The smaller data size of the sector cache can use larger amounts of metadata (e.g., larger number of valid and dirty bits along with tags etc.) but can allow for host access data to be tracked with more detail, thus increasing the overall cache hit rate in the DRAM data cache. Increasing the hit rate in the DRAM data cache can provide performance comparable to a DIMM with only DRAM memory devices but can additionally provide larger capacity memory, lower cost, and support for persistent memory. In addition, tracking data at a sector granularity can reduce bandwidth utilization between the DRAM memory device and the 3D cross-point memory when filling missing data is the sector cache or writing back dirty data from the DRAM memory device to the 3D cross-point memory. In some embodiments, the controller can track access statistics of segments of data having the smaller granularity stored at the DRAM memory device. Based on the access statistics, the controller can update the segment of data to the larger granularity by retrieving additional data associated with the segment of data and forming a new segment, at the larger granularity, which includes the segment of data and the additional data. With the larger granularity, less metadata is used to represent the segment of data. Therefore less processing overhead is incurred when managing a frequently accessed segment, for which the metadata is updated often.

Advantages of the present disclosure include, but are not limited to, an improved performance of the hybrid DIMM leading to a higher quality of service for the host system. For example, the caching operations between the first memory device and the second memory device can be internal to the hybrid DIMM. Thus, when data is transmitted from the 3D cross-point memory to be stored at the DRAM data cache, the transmitting of the data will not utilize an external bus or interface that is also used by the host system when receiving and transmitting write operations and read operations. Therefore, traffic between the DRAM and 3D cross-point memory is not limited by NVDIMM-P protocol improving hit rate and performance. In addition, rather than an additional caching component to store sectors, the sector cache is located within the same memory device as the page cache. Transfers between the sector cache and page cache can merely be an exchange of metadata, further reducing the use of bandwidth to and from the DRAM. Because the DRAM supports large cache lines and small cache lines, it provides the advantage of lower cost (larger cache lines) while increasing performance (smaller cache lines). In addition, the cache manager on the hybrid DIMM can work with any host CPU supporting NVDIMM-P protocol.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g. 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local controller 132) on the die and a controller (e.g., memory sub-system controller 115) for media management within the same memory device package. An example of a managed memory device is a managed NAND (MNAND) device.

In one embodiment, the memory sub-system 110 includes a cache manager 113 that can be used to track and manage data in the memory device 130 and the memory device 140. In some embodiments, the memory sub-system controller 115 includes at least a portion of the cache manager 113. In some embodiments, the cache manager 113 is part of the host system 120, an application, or an operating system. In other embodiments, local media controller 135 includes at least a portion of cache manager 113 and is configured to perform the functionality described herein. The cache manager 113 can communicate directly with the memory devices 130 and 140 via a synchronous interface. Furthermore, transfers of data between the memory device 130 and the memory device 140 can be done within the memory sub-system 110 without accessing the host system 120.

The memory device 140 can include a data cache that stores data from memory device 130 so that future requests for data can be served faster. A cache line is a basic unit for cache storage and can contain multiple bytes and/or words of data. A smaller cache line size has a higher hit rate but requires more tag memory than a large cache size line. A tag is a unique identifier for a group of data that can be used to differentiate different regions of mapped memory.

In some embodiments, all the data that is stored by the memory sub-system 110 can be stored at the memory device 130. Certain data that is stored at the memory device 130 can also be stored at the data cache of the memory device 140. For example, data that is determined to be more frequently, or more recently, accessed by the host system 120 can be stored at the data cache for faster host access. When the host system 120 provides a read request for data stored at the data cache (i.e., a cache hit), the data can be retrieved from the data cache as opposed to being retrieved from the memory device 130. The bandwidth or capability of retrieving data at the data cache can be faster than the bandwidth or capability of retrieving data at the memory device 130.

The data cache of the memory device 140 can be partitioned and include a sector cache 142 to store small cache lines (hereafter "sector(s)") and a page cache 144 to store large cache lines (hereafter "page(s)"). The sector cache 142 and the page cache 144 can be managed at different data sizes. The sector cache 142 can utilize a smaller granularity (smaller size) and the page cache 144 can utilize a larger granularity (larger size). In an example, a page can be 2 kilobytes in size, and a sector can be 64 bytes in size. A page can include one or more sectors. The page cache 144 can require less metadata to manage data (e.g., only a single valid bit for the entire page) utilizes a larger data size. The smaller data size of the sector cache 142 can require larger amounts of metadata (e.g., larger number of valid bits and/or dirty bits, tags etc.). Pages in the page cache 144 can be organized into one or more sets. In an example, a page set includes 24 pages. Similarly, sectors in sector cache 142 can be organized into one or more sets. In an example, a sector set includes 16 sectors.

The memory device 130 can store and manage data at a small granularity similar to the sector cache. For example, data can be stored at the memory device 130 at a data payload size, which can include one or more sectors in the sector cache 142. Data can therefore be transferred between the memory device 130 and the sector cache 142 at the data payload size (e.g., one or more sectors at a time).

In the sector cache 142, metadata associated with a "page" in the sector cache 142 (herein referred to as a "sector group") can include a valid bit for each of the sectors to indicate whether the sector includes valid data (e.g., whether the cache line associated with the sector is allocated for a transfer (not valid) or received the transfer (valid)). Furthermore, the metadata can include a dirty bit for each data payload in the sector group to that it can be determined if the data payload has been modified in the sector cache 142 and thus needs to be written back to the memory device 130. Accordingly, each sector in the sector cache 142 can be tracked and managed using the metadata associated with the sector group. The sector group metadata can also contain heuristics fields that help inform cache retention and pre-fetch policies.

Similar to the sector cache 142, metadata can be associated with each page in the page cache 144 to manage the corresponding page. For example, the metadata associated with a page in the page cache 144 can include a single valid bit and a single dirty bit because the page cache 144 is managed at the page level. Additional metadata can be associated with each page to determine eviction procedures among other management tasks. When the cache manager 113 determines that a sector group in the sector cache 142 is to be transferred to the page cache 144 (e.g., because it is frequently accessed), the cache manager 113 can fill the remaining portion of the page in the sector cache 142 with the corresponding sectors/data payloads from the memory device 130. Once the page is filled with the remaining sectors in the sector group, rather than transferring data between caches, the metadata associated with the page in which the sector resides can be copied into the page cache metadata. For example, the cache manager 113 can identify a page in the page cache 144 according to an eviction policy, and then swap the metadata (i.e., the address) of the page in the page cache with the metadata of the page in the sector cache 142. Therefore, no data is transferred but the pages can be interchanged between being managed at the page level (e.g., in the page cache 144) and being managed at the sector level (e.g., in the sector cache 142) within the data cache.

In particular, when a cache line is copied from memory device 130 into memory device 140 (e.g., the sector cache 142 or the page cache 144), a cache entry can be created. The cache entry can include copied data and the memory location of the copied data (e.g., a tag memory entry). The tag memory entry can be used to track a sector, a group of sectors (e.g., a sector group), and/or a page. Sectors in a sector group can be tracked using a single tag memory entry to reduce the amount of tag memory required for the sector cache 142.

Each page tag memory entry can include a tag (e.g., one or more host address bits), and associated page metadata. The associated page metadata can include dirty bit(s), valid bit(s), LRU (least recently accessed) data, etc. A dirty bit can be used to indicate whether a page has data inconsistent with non-volatile memory (e.g., memory device 130). A valid bit can be used to indicate whether a page is valid (e.g., whether the cache line associated with the page is allocated for a transfer (not valid) or received the transfer (valid)). The LRU data can include an LRU value, and can be used to indicate whether a page is least recently accessed by the host system 120. For example, when a page is accessed, an LRU value for that page can be set to a predetermined value (e.g., 24). LRU values for every other page in the page cache 144 or for every other page in a set of pages can be decreased by an amount (e.g., by 1). The LRU data can be used for eviction procedures. The cache manager 113 can track and manage each page in the page cache 144 using a page tag memory entry and/or page metadata.

Each sector tag memory entry can include a tag (e.g., a host address bit), and associated sector metadata for a sector or a sector group. Sector metadata associated with sectors in a sector group can include a valid bit for each of the sectors to indicate whether the sector is a valid piece of data. The sector group metadata can further include a dirty bit for each data payload in the sector group so that it can be determined if the data payload has been modified in the sector cache. The sector group metadata can further include LRU data for eviction procedures, which indicates that a sector is least recently accessed by the host. The sector group metadata can also include heuristics fields that help inform cache retention and pre-fetch policies. The cache manager 113 can track and manage each sector and sector group in the sector cache 142 using the sector tag memory entry and/or sector metadata.

In an example, the sector cache 142 can use 32 valid bits to indicate which sectors of the sector group are valid. In another example, the sector cache 142 can use 16 dirty bits to indicate a dirty situation for every 2 sectors or every sector pair. When a sector is to be evicted (i.e., dirty), the valid bit of the other sector of the sector pair can be checked. If it is set, the other sector can also be evicted. Two sectors can be read from memory device 130. If the valid bit of the other sector of the same sector pair is not set, both sectors can be written into the memory device 140. Otherwise, only the sector being filled can be written. In some embodiments, the cache manager 113 can use heuristics to account for the number of accesses to the sectors.

In some embodiments, page metadata can be associated with each page in the page cache 144 to manage each page. For example, the page metadata associated with a page in the page cache can include a single valid bit and a single dirty bit. Additional metadata can be associated with each page to determine eviction procedures among other management tasks.

In some embodiments, when a host access occurs (e.g., a read or a write operation) at the memory sub-system, the cache manager 113 can use a host address associated with the access to query tags associated with each page in the page cache 144 and each sector in the sector cache 142. If the cache manager 113 finds a match (using a page tag memory entry) in the page cache 144, then the data requested by the host system is in the page cache 144. The cache manager 113 can then provide the access requested by the host system 120 (e.g., read or write). If the cache manager 113 (using a sector tag memory entry) finds a match in the sector cache 142, the data can be retrieved, or accessed from the sector cache 142. Otherwise, any cache miss can be handled by the sector cache 142. For example, if a read operation is received and a cache miss occurs (i.e., the data is not in the page cache 144 or the sector cache 142), the cache manager 113 can evict a sector group based on an eviction policy of the cache manager 113. For example, the sector group to be evicted can be the least recently used. Any data with a dirty bit can be written back to the memory device 130. The cache manager 113 can then retrieve the requested data payload from the memory device 130 and replace the evicted sector group in the sector cache 142 with the sector group that includes the retrieved data payload.

In some embodiments, while data is in the sector cache 142, data access patterns and data access history can be tracked for a sector to determine whether it should be cached for a longer period of time in the page cache 144. The hit rate for the data cache (both the page cache 144 and the sector cache 142) can be increased through identifying general patterns of access and through aggregating a sufficient amount of data about host accesses of each sector group in the sector cache 142. The cache manager 113 can use the collected access data to determine a temperature of a sector group (e.g., a rate of access), access patterns of the sector and its corresponding page, etc., and then select an appropriate policy to maximize a hit rate of the data cache. For example, the cache manager 113 can include a set of cache management policies to choose from based on the access data collected for the sector cache.

As discussed above, the cache manager 113 can perform an eviction procedure (hereafter "eviction") using an eviction mode before data can be stored into the sector cache 142. The eviction mode can be sector based, page based, or any combination thereof. In sector based eviction mode, the cache manager 113 can select a sector in the sector cache 142. In an example, the cache manager 113 selects the sector using LRU data. If the selected sector includes a dirty bits, the cache manager 113 can send the sector to the non-volatile memory (e.g. memory device 130). In page based eviction mode, one or more evicted sectors can be sent to the page cache 144.

In some embodiments, the eviction mode can be determined using heuristics. Heuristics is technique or algorithm designed for solving a problem using non-standard methods. In one example, if the heuristics exceeds a threshold, the eviction mode can be page based. Otherwise, the eviction mode can be sector based. In other embodiments, an algorithm can examine the number of valid bits set as well as the number of dirty bits set. The eviction mode can be page based when heuristics, the number of valid bits set, and/or the number of dirty bits set exceed one or more thresholds. Otherwise, the eviction mode can be sector based. In some embodiments, the cache manager 113 can use a second page cache lookup using sector evict address to find an LRU page to evict. If the selected page is dirty, the cache manager 113 can send the entire page to the non-volatile memory (e.g. memory device 130) first. A second page cache lookup can be avoided if a page tag memory is divided into two separate sections (e.g., a first section for a first page set and a second section for a second page set). In some embodiments, when all sectors or pages of a set are used (e.g., valid) and a new page is needed to be inserted into the full set, the cache manager 113 can evict the LRU page. However, when a sector group needs to be evicted but its heuristics indicate that it may be beneficial to keep it in the cache, the cache manager 113 can move the sector group page cache 144 rather than evicting it. If the page page cache 144 is full, the cache manager 113 can evict an LRU page.

A sector can be uniquely associated with a page of the separate sections. Depending on the value of a host address bit, one of the two lookup results from the two corresponding page sets can be selected as the final page lookup results. The sector to be evicted can have the same index as a sector selected by using the host address. The cache manager 113 can select its corresponding page by using a LSB (least significant byte) of its tag value. Since the two lookup results of the first lookup can already be available after the first lookup, the second lookup results using the sector evict address can be readily available by using the LSB of the sector tag (to be evicted) to select one of the two first page lookup results.

In some embodiment, the cache manager 113 can perform a fill operation. In an example, the cache manager 113 can determine that a sector group in the sector cache should be transferred to the page cache. The cache manager 113 can fill the remaining portion of the page in the sector cache 142 with the corresponding sectors from the non-volatile memory (e.g. memory device 130). Once the cache manager 113 fills the page with the remaining sectors in the sector group, the cache manager 113 copies the metadata associated with the page in which the sector resides into the page metadata. For example, the cache manager 113 can identify a page in the page cache 144 according to an eviction mode, and then swap the metadata (i.e., the address) of the page in the page cache 144 with the metadata of the page in the sector cache 142. Therefore, no data is transferred but the pages can be interchanged between being managed at a page level (e.g., page cache 144) and being managed at a sector level (e.g., sector cache 142) within the memory device 140.

In some embodiments, to minimize bandwidth of reading the non-volatile memory, data is not read from the non-volatile memory to fill the page cache 144 for a page cache lookup miss. Rather, the cache manager 113 reads data from the sector cache 142 to the page cache 144. In an example, cache manager 113 reads data from the sector cache 142 to the page cache 144 based on a heuristics algorithm for a cache hit. For example, when the total number of accesses of the sectors of a sector group exceeds a threshold, the cache manager can move valid sectors to the page cache 144 and read invalid sectors from the non-volatile memory to fill a newly formed page. Once the page is filled, the cache manger 113 can set the page's valid bit to 1, and the page's dirty bit to 1 if any sector of the original sector group is dirty.

In page eviction mode, valid sectors can be moved to the page cache 144. The cache manager 113 can read invalid sectors from the non-volatile memory to completely fill the newly formed page (e.g., fill operation). In addition to the total number of accesses, cache manger 113 can determine a number of valid bits set as well as a number of dirty bits set. In some embodiments, the cache manager 113 can perform a page fill operation if the number of accesses exceeds a predetermined threshold, and/or the number of valid bits set exceeds another predetermined threshold, and/or the number of dirty bits set exceeds yet another predetermined threshold.

In some embodiments, the cache manager 113 can perform a clean operation. In an example, to evict sectors and pages (e.g., LRU sectors and pages) proactively before they are selected for eviction, the cache manager 113 can perform a clean operation to send any dirty sectors or pages to the non-volatile memory when their LRU values fall below a threshold value. The cache manager 113 can trigger a clean operation after LRU is updated. In some embodiments, the cache manager 113 can use a LRU updating algorithm, which can result in LRU values changing with a fixed pattern. For example, for the sector cache 142, all LRU values can be set to zero after a reset. After a first access to a first sector in the sector cache 142, a LRU value for the first sector can be set (e.g., to 15). After a subsequent access to a second sector in the sector cache 142, a second LRU value for the second sector can be set (e.g., to 15), while the first LRU value can be reduced (e.g., set to 14). This process can continue for each subsequent access. When the clean operation is enabled by the cache manager 113, a threshold value can be set (e.g., 4). When a sector's LRU value reaches the threshold value, the cache manager 113 can send that sector to non-volatile memory. It is noted that the clean operation can make a cache line (e.g., a sector, a page) clean (e.g., set a dirty bit from 1 to 0), but will not evict a cache line or change its LRU value.

In some embodiments, the cache manager 113 can use a mapping scheme to save the bandwidth required to move data from the sector cache 142 to the page cache 144. When data is moved from the sector cache 142 to the page cache 144, a page can be selected first. For a sector row, there can be two possible corresponding page rows depending on the LSB (least significant bit) of a sector tag. For example, a first sector row can correspond to a first page row if the LSB of its sector tag is 0, and to a second page row if the LSB of its tag is 1; a second sector row can correspond to a third page row adjacent the first page row if the LSB of its tag is 0 and to a fourth page row adjacent the second page row if the LSB of its tag is 1, and so on. The sector cache lines and the page cache lines together can form a page mapping set in that data doesn't need to be moved but the physical memory device 140 pages used for each cache line can be swapped. To achieve page swapping, each tag memory entry can be added with an additional field (e.g., a page index).

Figure 2:
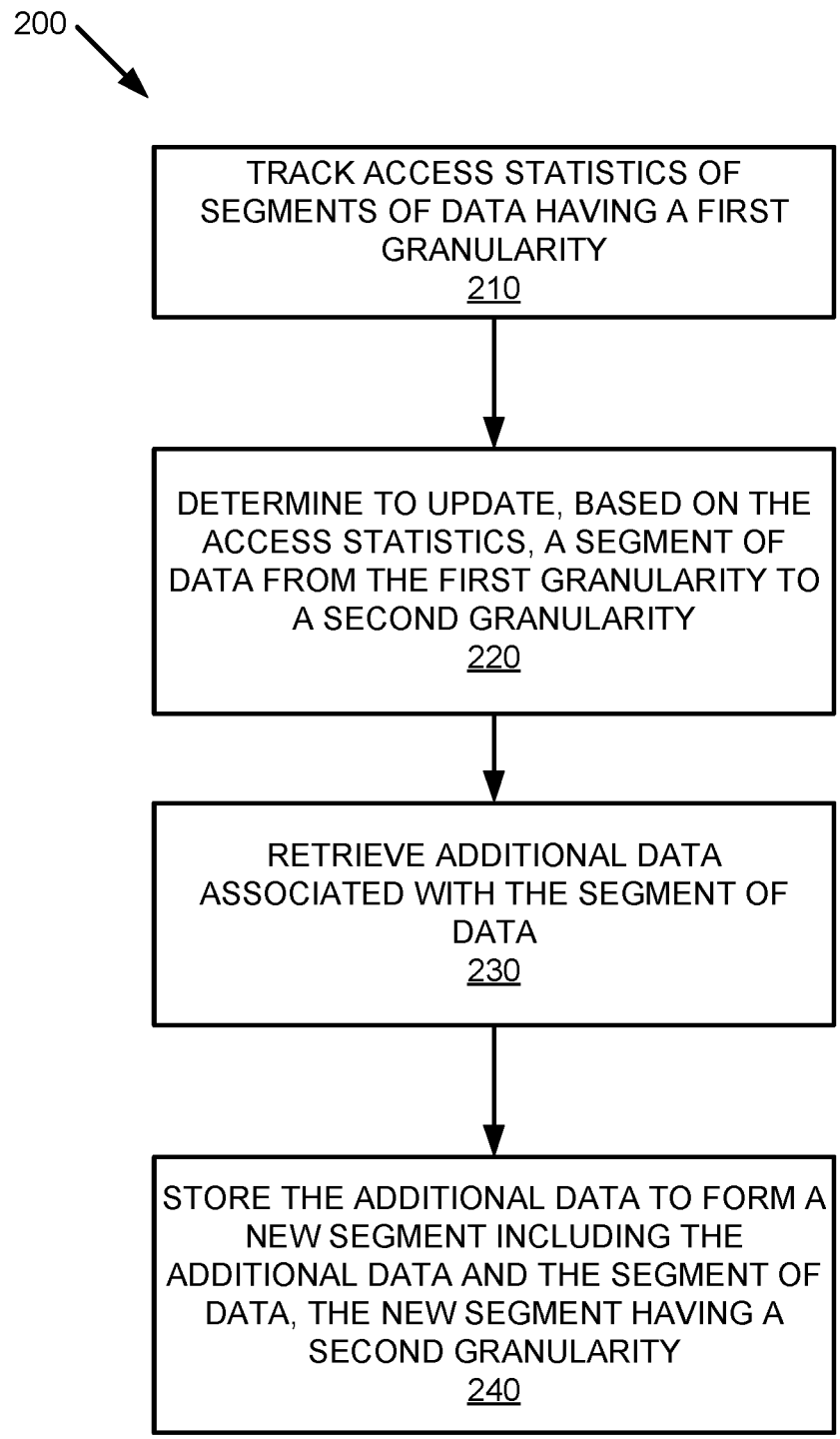
FIG. 2 is a flow diagram of an example method for tracking and managing data caches, in accordance with some embodiments of the present disclosure.

FIG. 2 is a flow diagram of an example method 200 for tracking and managing data caches, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the cache manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Method 200 can relate to a first memory device (e.g., memory device 130) and a second memory device (e.g., memory device 140). The memory device 130 can be coupled to the memory device 140. The memory device 140 can act as a cache to the memory device 130. The memory device 130, the memory device 140, and the processing logic can be included within a hybrid dual in-line memory module. The first memory device can be a cross-point array memory device. The second memory device can be a DRAM, an SDRAM, or any other volatile memory, or any combination thereof.

At operation 210, the processing logic tracks access statistics of segments of data stored at the memory device 140, where the segments have a first granularity. The first granularity can be utilized by the sector cache 142. The segments of data can include one or more sectors, or a sector group. The statistics data can include a number of accesses to the data, a rate of access to the data (e.g., a hit rate or how often the data is accesses), etc. In some embodiments, the data can be associated with metadata, such as, for example, a number of valid bits set for each sector or sector group, and a number of dirty bits set for each sector or sector group.

At operation 220, the processing logic determines to update, based on the access statistics, a segment of data stored at the memory device 140 from the first granularity to a second granularity. The second granularity can be utilized by the page cache 144, and can be larger than the first granularity. The processing logic can determine to update the segment of data from the first granularity to the second granularity when the access statistics satisfy a threshold criterion. In an example, the processing logic can determine that the threshold criterion is satisfied when the total number of lookups meets or exceeds a number of accesses threshold value. In another example, the processing logic can determine that the threshold criterion is satisfied when a rate of access meets or exceeds a rate of access threshold value. In some embodiments, the processing logic can first evict least recently used data from the page cache 144 and/or sector cache 142 based on an eviction policy.

At block 230, the processing logic retrieves additional data associated with the segment of data from the memory device 130. The additional data can include corresponding sectors of a page that were not present in the sector cache 142.

At block 240, the processing logic stores the additional data at the second memory device to form a new segment comprising the additional data and the segment of data. The new segment can have a second granularity. In an example, the updating includes identifying a physical address of an evicted page, identifying a physical address of the new segment, and exchanging the physical address of the new segment with the physical address of the least recently used page.

Figure 3:
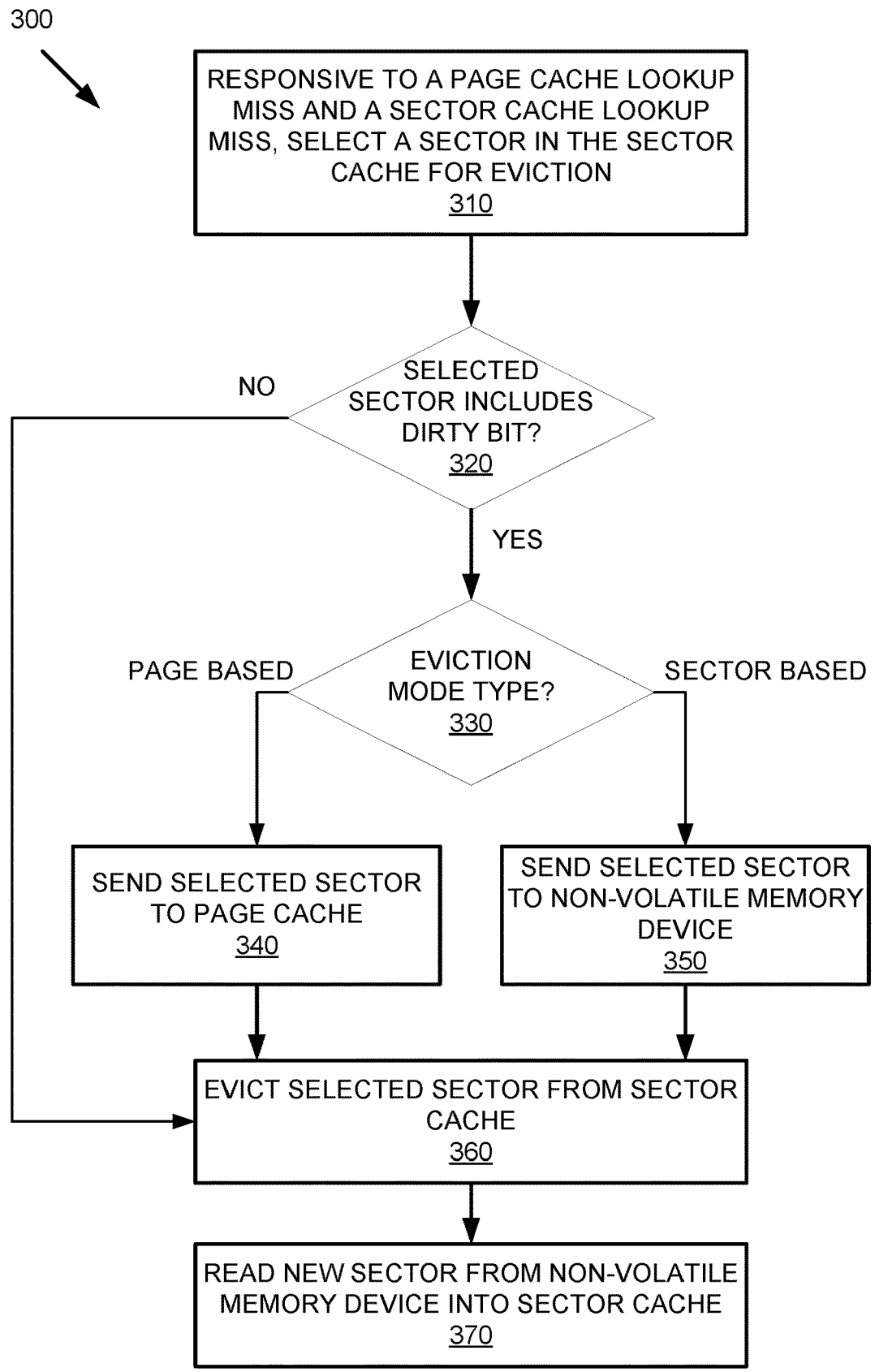
FIG. 3 is a flow diagram of an example method for performing operations in response to a page cache miss and a sector cache miss, in accordance with some embodiments of the present disclosure.

FIG. 3 is a flow diagram of an example method 300 performing operations in response to a page cache miss and a sector cache miss, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the cache manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, responsive to a page cache 144 lookup miss and a sector cache 142 lookup miss, the processing logic can select a sector in the sector cache 142 for eviction. The eviction can be based on an eviction policy (e.g., sector based eviction or page based eviction). The processing logic can select the sector based on LRU data satisfying a threshold criterion. For example, the processing logic can select a sector that has the lowest LRU value, or a sector that has a LRU value below a threshold value.

At operation 320, the processing logic determines whether the selected sector includes a dirty bit. A dirty bit can indicate if the sector has been modified in the sector cache 142 and thus needs to be written back to the memory device 130. Responsive to determining that the selected sector includes a dirty bit, the processing logic, at operation 330, determines the eviction mode type, which can be sector based eviction or page based eviction. The eviction mode can be selected by determining whether heuristics of a sector group associated with the sector satisfy a threshold criterion, a number of valid bits set of the sector group satisfies a threshold criterion, a number of dirty bits of the sector group satisfies a threshold criterion, or any combination thereof. For example, the processing logic can determine whether the heuristics, the number of valid bits set, and/or the number of dirty bits set exceed a respective threshold value. If the selected sector does not include a dirty bit, the processing logic proceeds to operation 360.

Responsive to determining that the eviction mode type is page based, the processing logic, at operation 340, sends (e.g., copies) the data at the selected sector to the page cache 144. Responsive to determining that the eviction mode type is sector based, the processing logic, at operation 350, sends the data at the selected sector to the non-volatile memory device (e.g., memory device 130).

At operation 360, the processing logic evicts the selected sector from the sector cache 142. At operation 370, the processing logic reads a new sector, associated with the page cache lookup miss and the sector cache lookup miss, into the sector cache 142. The new sector can be associated with a LRU value for further eviction procedures.

Figure 4:
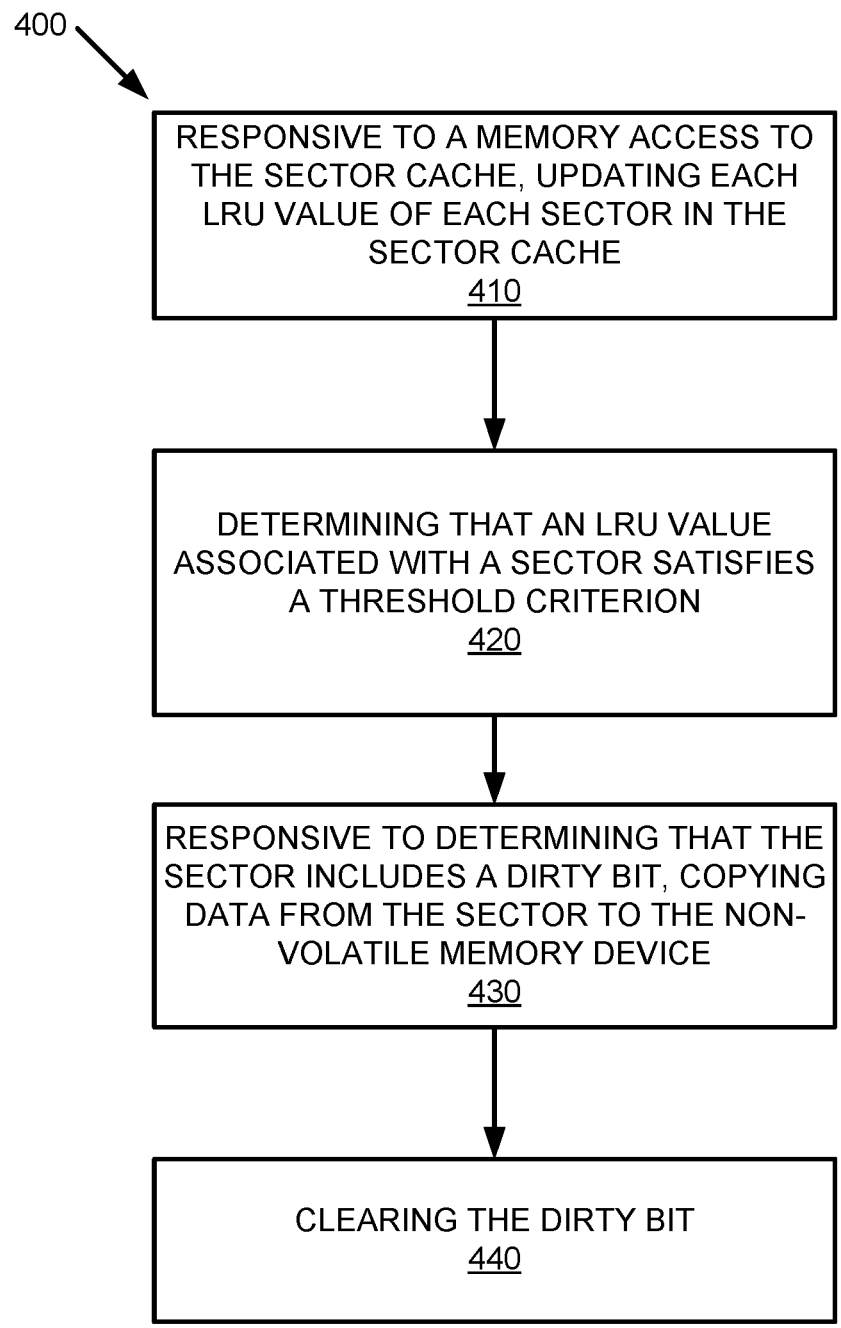
FIG. 4 is a flow diagram of an example method for performing a clean operation, in accordance with some embodiments of the present disclosure.

FIG. 4 is a flow diagram of an example method 400 performing a clean operation, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the cache manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. By way of example, FIG. 4 will discuss sectors in the sector cache 142. However, method 400 can be similarly performed on pages in the page cache 144.

At operation 410, responsive to a memory access to the sector cache 142, the processing logic can update each LRU value of each sector in the sector cache. The LRU value can be used to indicate whether a page is least recently accessed by the host system 120. For example, when a sector is accessed, an LRU value for that sector can be set to a predetermined value (e.g., 15). LRU values for every other sector in the sector cache 144 or can be decreased by an amount (e.g., by 1).

At operation 420, the processing logic can determine that an LRU value associated with a sector in the sector cache 142 satisfices a threshold criterion. For example, the processing logic can determine whether the LRU value is at or below a threshold value.

At operation 430, responsive to determining that the sector includes a dirty bit, the processing logic can copy data from the sector to the non-volatile memory device (e.g., memory device 130). The dirty bit can indicate if the sector has been modified in the sector cache 142.

At operation 440, the processing logic can clear the dirty bit. In an example, the dirty bit is cleared by setting the dirty bit from 1 to 0. It is noted that the LRU value of the sector does not reset to the predetermined value.

Figure 5:
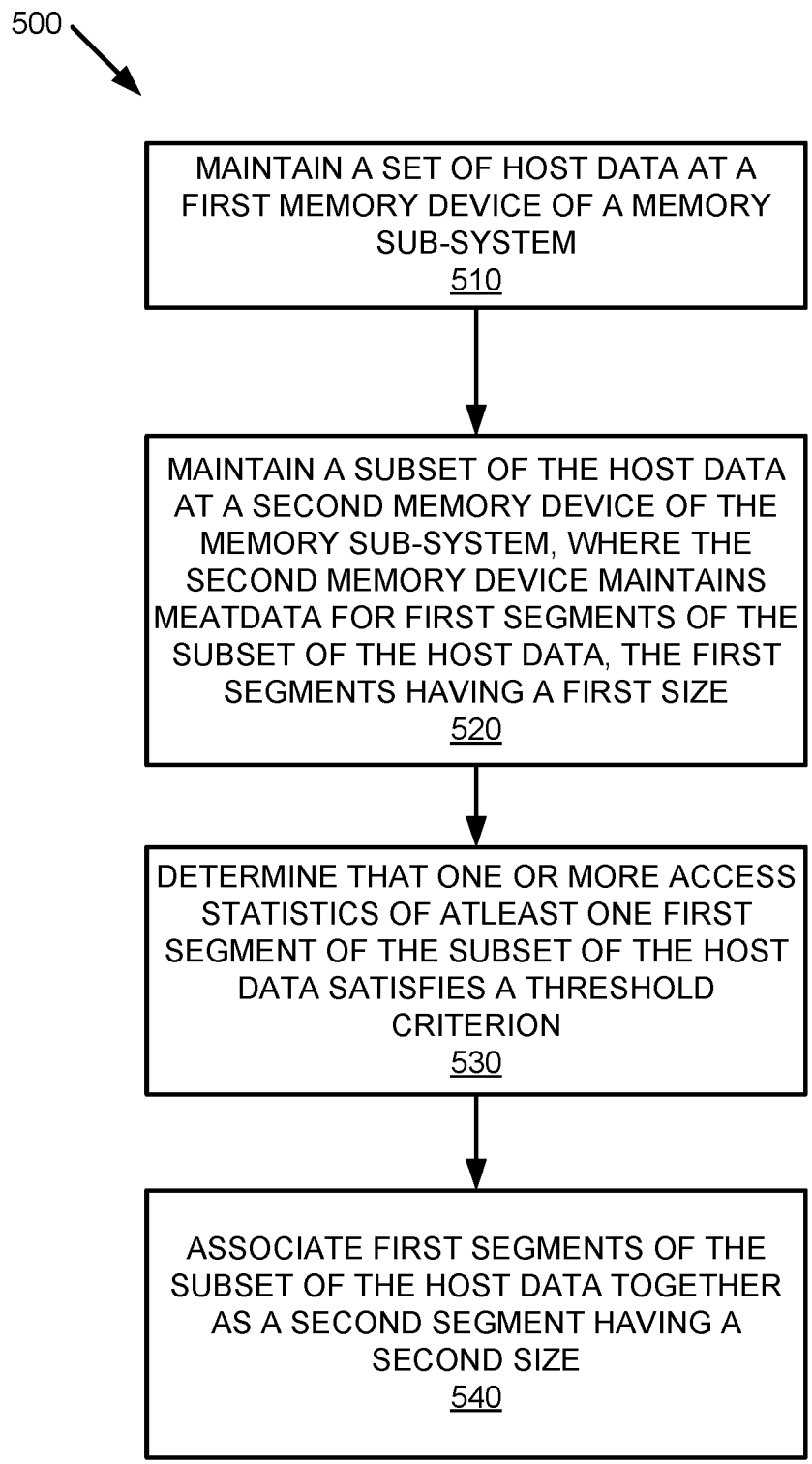
FIG. 5 is a flow diagram of another example method for tracking and managing data caches, in accordance with some embodiments of the present disclosure

FIG. 5 is a flow diagram of another example method 500 for tracking and managing data caches, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the cache manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic maintains a set of host data at memory device 130. At operation 520, the processing logic maintain a subset of the host data at a memory device 140. The memory device 140 can have a lower access latency than the memory device 130 and can be used as a cache for the memory device 130. The memory device 140 maintains metadata for first segments of the subset of the host data, the first segments having a first size. In an example, the first segments include sectors.

At operation 530, the processing logic determines that one or more access statistics of at least one first segment of the subset of the host data satisfies a threshold criterion. For example, the processing logic can determine that the threshold criterion is satisfied when the total number of lookups exceeds a number of accesses threshold value. In another example, the processing logic can determine that the threshold criterion is satisfied when a rate of access exceeds a rate of access threshold value. In some embodiments, the processing logic can first evict least recently used data from the page cache 144 and/or sector cache 142 based on an eviction policy At operation 540, the processing logic can associate one or more first segments of the subset of the host data together as a second segment. The one or more first segments can include the at least one first segment. The memory device 140 can maintain metadata for the second segment of the host data. The second segment can have a second size. For example, the second segment can be a page.

Figure 6:
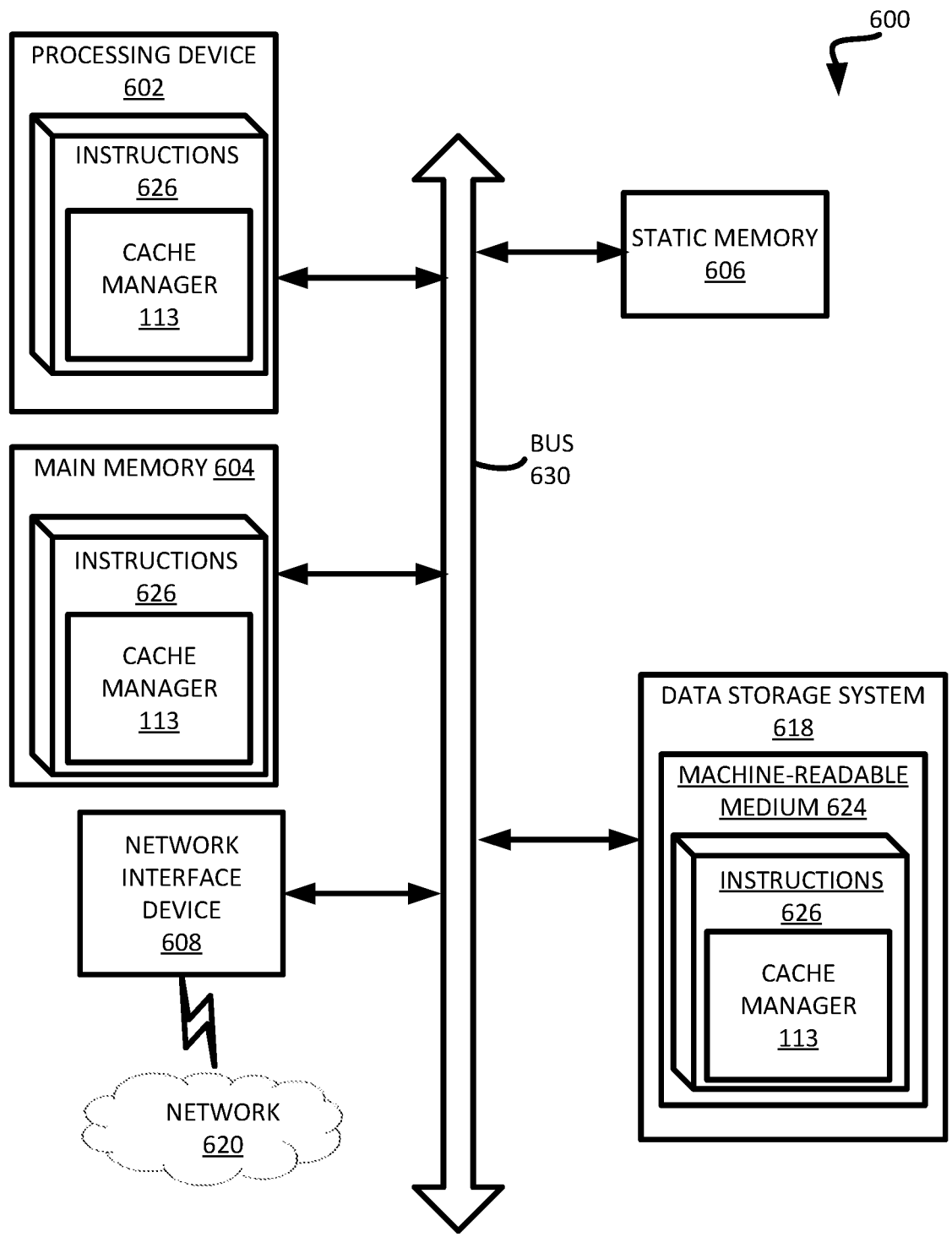
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes or utilizes a memory sub-system (e.g., the memory sub-system 110 of FIG. 1) or can be used to perform the operations of a controller (e.g., to execute an operating system to perform operations corresponding to cache manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630. Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to cache manager 113 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a first memory device;
   a second memory device coupled to the first memory device, wherein the second memory device has a lower access latency than the first memory device and is used as a cache for the first memory device; and
   a processing device, operatively coupled to the first and second memory devices, to perform operations comprising:
   tracking access statistics of segments of data stored at the second memory device, wherein the segments have a first granularity, wherein the access statistics comprise at least one of an access rate to one or more of the segments or a value indicative of multiple accesses to one or more of the segments; and
   responsive to the access statistics satisfying a threshold criterion, updating a segment of data stored at the second memory device from the first granularity to a second granularity, wherein the updating comprises:
   retrieving additional data associated with the segment of data from the first memory device; and
   storing the additional data at the second memory device to form a new segment comprising the additional data and the segment of data, wherein the new segment has the second granularity.

2. The system of claim 1, wherein the first memory device, second memory device and the processing device are included within a hybrid dual in-line memory module, and wherein the first memory device is a cross-point array memory device.

3. The system of claim 1, wherein the processing device to perform further operations comprising:
   evicting an old segment having a second granularity from the second memory device.

4. The system of claim 3, wherein the processing device to perform further operations comprising:
   identifying a physical address of the old segment;
   identifying a physical address of the new segment; and
   exchanging the physical address of the new segment with the physical address of the old segment.

5. The system of claim 3, wherein the evicting is based on least recently used (LRU) data.

6. The system of claim 1, wherein determining to update the data stored at the second memory device from the first granularity to the second granularity comprises:
   determining that a total number of lookups from the access statistics satisfy a threshold criterion.

7. The system of claim 1, wherein the segment of data is associated with at least one of a valid bit or a dirty bit.

8. The system of claim 1, wherein the first memory device comprises a non-volatile memory device and the second memory device comprises a volatile memory device.

9. A method comprising:
   maintaining a set of host data at a first memory device of a memory sub-system;
   maintaining a subset of the host data at a second memory device of the memory sub-system, wherein the second memory device has a lower access latency than the first memory device and is used as a cache for the first memory device and wherein the second memory device maintains metadata for first segments of the subset of the host data, the first segments having a first size;
   determining that one or more access statistics of at least one first segment of the subset of the host data satisfies a threshold criterion, wherein the one or more access statistics comprise at least one of an access rate to one or more of the segments or a value indicative of multiple accesses to one or more of the segments; and
   associating a plurality of the first segments of the subset of the host data together as a second segment, the plurality of the first segments comprising the at least one first segment, wherein the second memory device maintains metadata for the second segment of the host data, the second segment having a second size.

10. The method of claim 9, wherein the first memory device, second memory device and the processing device are included within a hybrid dual in-line memory module, and wherein the second memory device is a cross-point array memory device.

11. The method of claim 9, further comprising:
evicting an old segment having a second granularity from the second memory device.

12. The method of claim 11, further comprising:
identifying a physical address of the old segment;
identifying a physical address of the new segment; and
exchanging the physical address of the new segment with the physical address of the old segment.

13. The method of claim 11, wherein the evicting is based on least recently used (LRU) data.

14. A non-transitory computer-readable storage medium comprising instructions that, when executed by a processing device operatively coupled to a first memory device and a second memory device, performs operations comprising:
tracking access statistics of segments of data stored at the second memory device, wherein the segments have a first granularity, wherein the access statistics comprise at least one of an access rate to one or more of the segments or a value indicative of multiple accesses to one or more of the segments; and
responsive to the access statistics satisfying a threshold criterion, updating a segment of data stored at the second memory device from the first granularity to a second granularity, wherein the updating comprises;
retrieving additional data associated with the segment of data from the first memory device; and
storing the additional data at the second memory device to form a new segment comprising the additional data and the segment of data, wherein the new segment has the second granularity.

15. The non-transitory computer-readable storage medium of claim 14, wherein the first memory device, second memory device and the processing device are included within a hybrid dual in-line memory module, and wherein the first memory device is a cross-point array memory device.

16. The non-transitory computer-readable storage medium of claim 14, wherein the processing device to perform further operations comprising:
evicting an old segment having a second granularity from the second memory device.

17. The non-transitory computer-readable storage medium of claim 16, wherein the processing device to perform further operations comprising:
identifying a physical address of the old segment;
identifying a physical address of the new segment; and
exchanging the physical address of the new segment with the physical address of the old segment.

18. The non-transitory computer-readable storage medium of claim 16, wherein the evicting is based on least recently used (LRU) data.

19. The non-transitory computer-readable storage medium of claim 14, wherein the segment data is associated with at least one of a valid bit or a dirty bit.

20. The non-transitory computer-readable storage medium of claim 14, wherein determining to update the data stored at the second memory device from the first granularity to the second granularity comprises:
determining that a total number of lookups from the access statistics satisfy a threshold criterion.

* * * * *